United States Patent [19]
Yamade et al.

[11] Patent Number: 5,895,451
[45] Date of Patent: Apr. 20, 1999

[54] SCHEDULER APPARATUS WITH COLOR CODE APPOINTMENT TIMES SHOWN ON DISPLAY

[75] Inventors: Kinya Yamade, Tenri; Tadao Sano, Yamatotakada, both of Japan

[73] Assignee: Sharp Kabushiki Kaisha, Osaka, Japan

[21] Appl. No.: 08/859,488

[22] Filed: May 20, 1997

[30] Foreign Application Priority Data

May 27, 1996 [JP] Japan ................... 8-131915

[51] Int. Cl.⁶ ................................. G06F 3/00
[52] U.S. Cl. ......................... 705/8; 345/963
[58] Field of Search .................. 345/133, 140, 345/141, 147, 148, 150, 431, 440, 963; 705/5, 8, 9

[56] References Cited

U.S. PATENT DOCUMENTS

| | | | |
|---|---|---|---|
| 4,700,318 | 10/1987 | Ockman | 345/431 |
| 5,323,314 | 6/1994 | Baber et al. | 705/8 |
| 5,487,144 | 1/1996 | Takahashi et al. | 345/963 |
| 5,528,745 | 6/1996 | King et al. | 345/963 |
| 5,659,768 | 8/1997 | Forbes et al. | 707/517 |
| 5,745,110 | 4/1998 | Ertemalp | 345/340 |
| 5,761,646 | 6/1998 | Frid-Nielsen et al. | 705/9 |

FOREIGN PATENT DOCUMENTS 4-037945  2/1992  Japan.

*Primary Examiner*—Mark K. Zimmerman
*Assistant Examiner*—Vincent E. Kovalick
*Attorney, Agent, or Firm*—Nixon & Vanderhye P.C.

[57] ABSTRACT

The invention provides a information processing apparatus which offers easy understanding of not only schedules, but also starting times of the schedules. Contents of the schedules are displayed in colors which indicate morning, afternoon, and evening in descending order from top to bottom, respectively. Bar graphs are also shown in colors corresponding to the schedules.

8 Claims, 11 Drawing Sheets

SCHEDULER APPARATUS WITH COLOR CODE APPOINTMENT TIMES SHOWN ON DISPLAY

BACKGROUND OF THE INVENTION

1. Field of the Invention

The present invention relates to a information processing apparatus provided with a schedule function, such as a portable information terminal or an electronic notebook.

2. Description of the Related Art

A conventional technique is disclosed in Japanese Unexamined Patent Publication JP-A 4-37945 (1992) wherein, in case where a plurality of data time periods are overlapped with each other in schedule data, the overlapped areas can be easily recognized.

In the prior art, a time period of schedule data extending between a starting time and an end time is shown in a column graph and when a plurality of time periods are overlapped with each other, the overlapped areas are shown in a different appearance.

In the prior art, when a plurality of data time periods are overlapped with each other in schedule data, it is possible to recognize the overlapped areas. It is impossible, however, to clearly recognize a starting time , which is the most important data in the schedule data. On the other hand, in a construction which allows data of each schedule to be displayed individually, the entire schedule for one day cannot be recognized at a glance, although each of starting times and end times can be understood.

SUMMARY OF THE INVENTION

In view of these problems, an object of the invention is to provide a schedule display device which makes users easily understand not only schedules but also starting times of the respective schedules.

The present invention provides a information processing apparatus comprising:

inputting means for inputting schedule data including a date, a starting time in the date, and a schedule content which is to be started at the starting time;

storing means for storing the schedule data which has been inputted by the inputting means;

displaying means for displaying the schedule data which has been stored in the storing means; and display controlling means for controlling the displaying means to display the schedule data in a color varied according to the starting time of the schedule data which has been stored in the storing means.

In FIG. 6 which will be detailed later, a table 51 consists of a starting time display area 52 and a schedule contents display area 53, and forms a schedule contents input/output section 26. The schedule contents refer to events such as "1–45 conference room", "a luncheon", and "to visit A company" which are shown in the schedule contents display area 53. The starting time display area 52 may display the end time of each schedule content. In the table 51 since "8:00 a.m.–10:00 a.m., 1–45 conference room" takes place in the morning, it is displayed in green which indicates the morning. Since "12:00 p.m.–1:00 p.m., a luncheon" takes place in the afternoon, it is displayed in yellow which indicates the afternoon. Since "5:00 p.m.–6:30 p.m., to visit A company" takes place in the evening, it is displayed in blue which indicates the evening. Thus, data of each schedule is displayed in the color corresponding to the time period to which the starting time of the schedule data belongs. Schedule data may be displayed in other ways than using such a table and may be displayed regardless of their occurrence times unlike in FIG. 6.

The invention is characterized in that:

the information processing apparatus comprises color storing means for dividing one day into a plurality of time periods, assigning different colors to the plurality of time periods, and storing the different colors in association with the corresponding time periods, and the display controlling means detects the time period to which the starting time of the schedule data belongs and controls the displaying means to display the schedule data in the color assigned to the detected time period, of the colors stored in the color storing means.

When an end time of a schedule content is included in schedule data, and a starting time and the end time of the schedule content belong to different time periods from each other, that is, the schedule content extends over more than one time period, the schedule data is displayed in a color which is assigned to the starting time.

The invention is characterized in that the information processing apparatus comprises setting means for variably setting time periods and colors stored in the color storing means.

As will be explained later with reference to Table 1, when the current time is referred to as T, a user of this information processing apparatus may divide one day into three time periods which are displayed in green, yellow, and blue, respectively in a first embodiment, and in green, orange, and blue, respectively in a second embodiment. The setting of the time periods can be changed depending on the user of the information processing apparatus. In a third embodiment, one day is divided into four time periods which are displayed in red, yellow, blue, and black, respectively.

The invention is characterized in that the setting means divides one day into predetermined time units and the time periods are determined by grouping the time units.

As will be detailed later, for example, one day is divided into 15-minute units, that is, 96 time units. The time periods are determined by grouping the time units. For example, in the first embodiment shown in Table 1, 15-minute units during 0:00 a.m.–10:00 a.m. are displayed as one group in green which represents a first time period. Then, 15-minute units during 10:00 a.m.–5:00 p.m. are displayed as another group in yellow which represents a second time period. In this manner, each time period can be set every 15 minutes by changing colors. The time unit may not be 15 minutes and may be 30 minutes or one hour.

The invention is characterized in that the displaying means displays a starting time display area which can display a plurality of starting times and a schedule contents display area which can display a plurality of schedule contents, in a table form so as to individually correspond to each other; and the display controlling means displays the starting times shown in the starting time display area and the schedule contents shown in the schedule content display area in colors corresponding to the starting times.

The invention is characterized in that the displaying means includes:

a bar graph display area extending in a longitudinal direction which is either a horizontal or a vertical direction, and a time display area arranged along the bar graph display area, in which numeric characters representing times of at least part of the day are displayed at regular intervals;

end times of schedule contents are also inputted by the inputting means; and the display controlling means displays a schedule time period of the schedule data which extends from the starting time to the time as a bar graph in the bar graph display area in a color corresponding to the starting time.

A bar graph 23 shown in FIG. 6 includes a bar graph display area 54 and a time display area 55. The bar graph display area 54 extends in the longitudinal or horizontal direction. The time display area 55 is placed along the bar graph display area 54, in which numeric characters representing hours within a period of at least a part of a day, for example, numeric characters: "7, 9, 11, 1, 3, 5, 7, and 9" within a period of 7:00 a.m. to 9:00 p.m. in the case shown in FIG. 6 are displayed at regular intervals. In this time display area, the symbol "·" between 7 and 9 adjacent to 7 represents 8 o'clock, and 10 o'clock, 12 o'clock, 2 o'clock . . . are similarly represented by the same symbol. Schedule time periods which extend between the starting time and the end time are referred to as 56, 57, and 58. These schedule time periods 56, 57, and 58 are the schedule time periods displayed in a starting time display area 52, which are displayed in the form of a column having consecutive colors each assigned to the time period to which the starting time belongs.

In the first aspect of the invention, the information processing apparatus comprises inputting means for inputting schedule data including a date, time, and a schedule content; storing means for storing the schedule data which has been inputted by the inputting means; displaying means for displaying the schedule data which has been stored in the storing means; and display controlling means for controlling the displaying means to display the schedule data in a color varied according to a starting time of the schedule data which has been stored in the storing means. The display of schedule data in different colors makes it easy for users to understand schedules and the starting time of each schedule.

In the second aspect of the invention, the information processing apparatus further comprises color storing means for storing different colors in association with the corresponding time periods; and the display controlling means makes the displaying means display the schedule data in a color according to the information stored in the color storing means. Consequently, it becomes easy for users to understand schedules and a starting time of each schedule.

In the third aspect of the invention, the information processing apparatus further comprises setting means for setting time periods and colors which are stored in the color storing means. Consequently, the information processing apparatus can be user-friendly, allowing users to set colors and time periods as they like.

BRIEF DESCRIPTION OF THE DRAWINGS

Other and further objects, features, and advantages of the invention will be explicit from the following detailed description taken with reference to the drawings wherein.

DETAILED DESCRIPTION OF THE PREFERRED EMBODIMENTS

Figure 1:
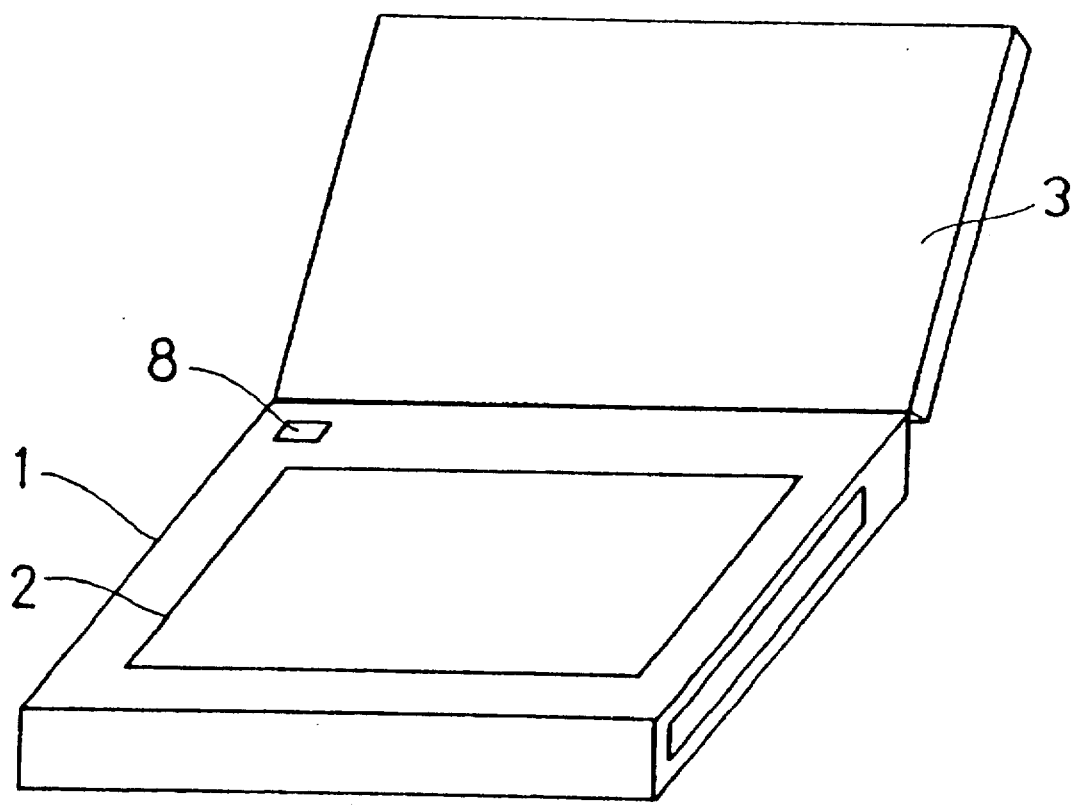
FIG. 1 is a perspective view of the external appearance of a information processing apparatus of the invention.

Now referring to the drawings, preferred embodiments of the invention are described below.

FIG. 1 is a perspective view of the external appearance of a information processing apparatus of the invention.

In FIG. 1 the information processing apparatus of the invention is composed of a main cabinet 1 and a lid 3. The main cabinet 1 includes an input/output portion 2 which includes a display and a transparent tablet which are integrated with each other, an infrared communication portion (not shown), a pen holder and so on. The main cabinet 1 further includes a built-in power source which supplies power to the input/output portion 2, the infrared communication portion, and a control circuit which controls an interface etc. The input/output unit 2 will be detailed with reference to FIG. 2 later.

The lid 3 is hinged with the back surface of the main cabinet 1. When the lid 3 is closed up, the lid 3 rotatively moves covering the input/output portion 2. In the closed state, the lid 3 protects the input/output portion 2 when the apparatus is carried.

The main cabinet 1 is further provided with a main power source 8 including a switch for turning on and off power supply.

Figure 2:
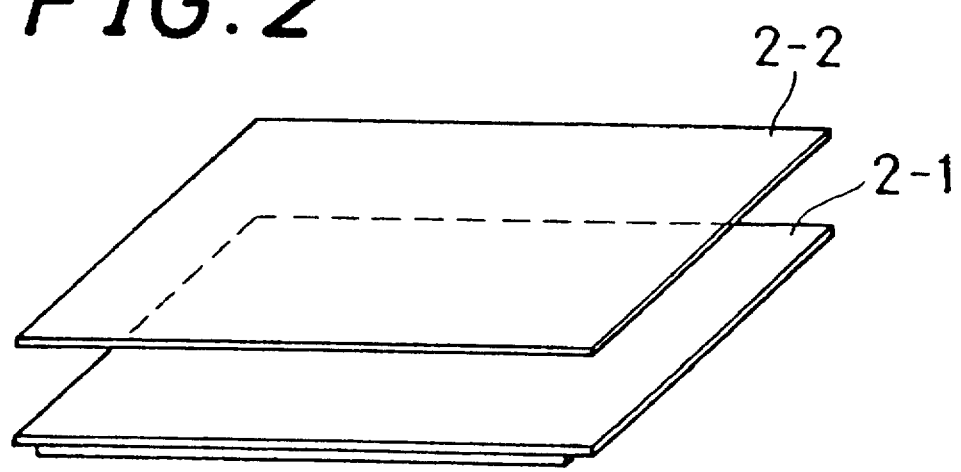
FIG. 2 is an exploded perspective view of an input/output portion.

FIG. 2 is an exploded perspective view of the input/output portion 2. The input/output portion 2 is a combination of a liquid crystal display 2-1, a transparent tablet 2-2 large enough to cover the display 2-1, and a back light composed of an EL(electro-luminescence) panel.

The liquid crystal display 2-1 is made thin, placed in front of the back light, and can display letters and characters in three or more colors. The pixels are arranged in a matrix form and irradiated by the back light from behind, which makes it possible for users to see a color display screen in a dark place. When a user operates a button display on the liquid crystal display 2-1 with his fingers or a pen type operation member, the transparent tablet 2-2 inputs the data on the button display. Hand-written letters also can be read and inputted.

The transparent tablet 2-2 is provided with a pair of transparent electrodes which are disposed to face each other inside the two transparent sheets, and small projecting spacers printed on the sheets at regular intervals to prevent the contact of the electrodes in the normal condition where a direction of pressing is not given. The electrodes come into contact with each other when a user presses the tablet 2-2 with his fingers or a pen, and the selected position is detected through an electric signal which indicates the contact.

Figure 3:
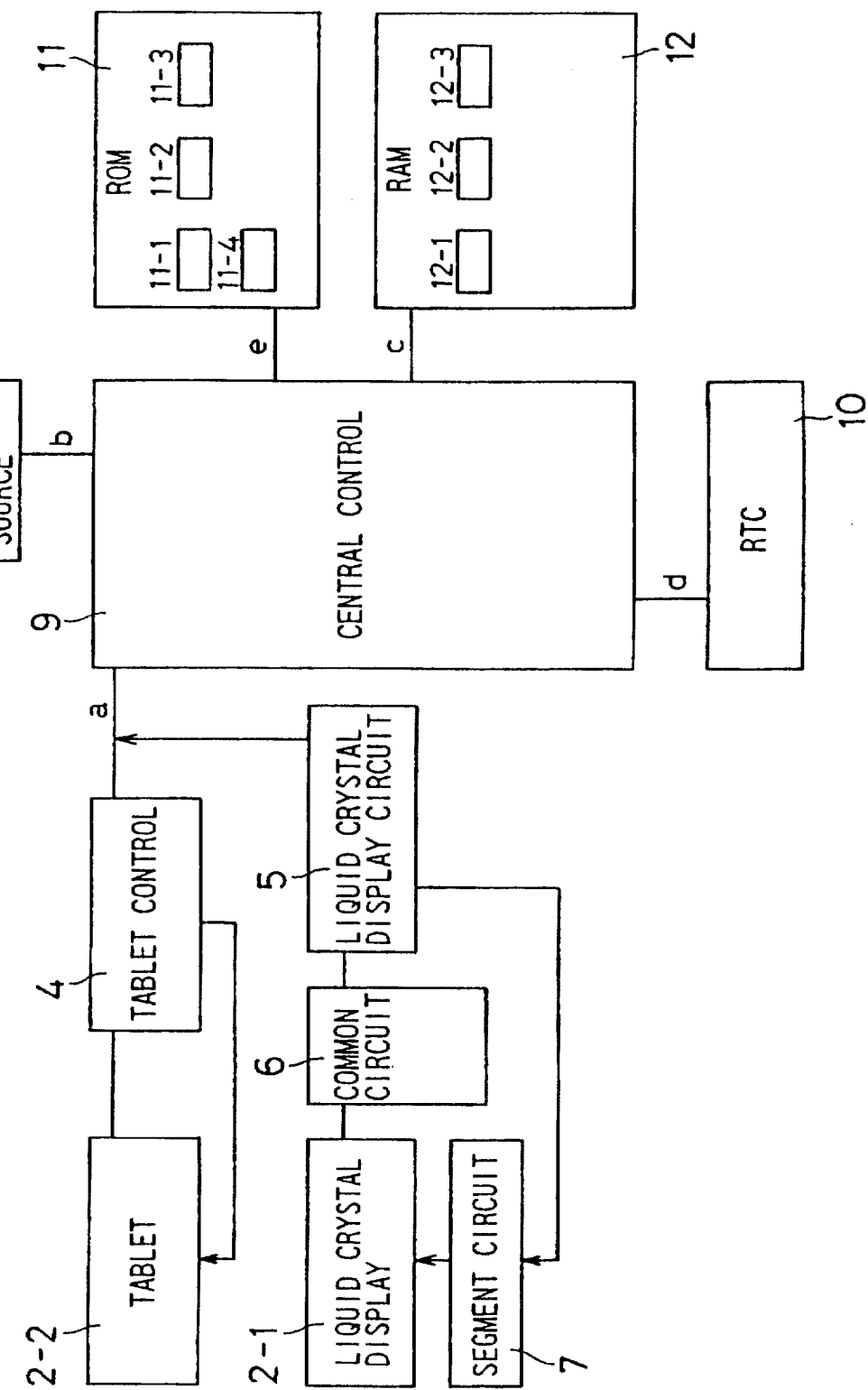
FIG. 3 is a block diagram showing the information processing apparatus of the invention.

The positions on the liquid crystal display 2-1 which have been selected by a user are detected by synchronously detecting information on the positions of the transparent tablet 2-2 which have been pressed by a user with his fingers or a pen and information on display contents on the liquid crystal display 2-1. FIG. 3 is a block diagram showing the information processing apparatus of the invention. The information processing apparatus is composed of the liquid crystal display 2-1, the transparent tablet 2-2, a tablet control 4, a liquid crystal display circuit 5, a common circuit 6, a segment circuit 7, the main power source 8, a central control 9, an RTC (Read Time Clock) 10, a ROM (Read Only Memory) 11, and a RAM (Random Access Memory) 12.

The tablet control 4 takes coordinate information from the transparent tablet 2-2. The tablet control 4 is connected with the transparent electrodes provided on the transparent sheets, and detects the coordinates of positions which are pressed by a user with his fingers or a pen from the contact of the electrodes.

The liquid crystal display circuit 5 stores dot positions where liquid crystal is lighted as a bit map and transmits signals to the common circuit 6 and the segment circuit 7 in case of necessity.

The common circuit 6 selects common electrodes which compose the row electrodes of the liquid crystal display 2-1 individually and in sequence. The segment circuit 7 selects segment electrodes which compose column electrodes which are arranged at right angles to the common electrodes via the liquid crystal layer in-between while each common electrode is activated. Consequently, the pixels on the intersections of the common electrodes and the segment electrodes are selectively activated and displayed.

The central control 9 controls input information and output information by means of various instructions. The central control 9 is connected with the tablet control 4 via a control line "a", with the main power source 8 via a control line "b", with the RAM 12 via a control line "c", with the RTC 10 via a control line "d", and with the ROM 11 via a control line "e".

The RTC 10 counts time using clock signals (not shown) and outputs information on the current date and time.

The ROM 11 includes a program area 11-1 where the program showing a operation of the central control 9 is stored, a calendar information program area 11-2 which counts dates, a program area 11-3 which converts and outputs picture information to be displayed on the liquid crystal display 2-1, and a coordinate conversion storage area 11-4 where the conversion information for converting the coordinate which has been detected by the tablet control 4 into the coordinate corresponding to the display position.

The RAM 12 includes a character storage 12-1 which stores character information such as a composition inputted by a user through the input/output portion 2, a schedule storage 12-2 which stores schedule data, and a color information storage 12-3 which stores color information of each time period.

Figure 4:
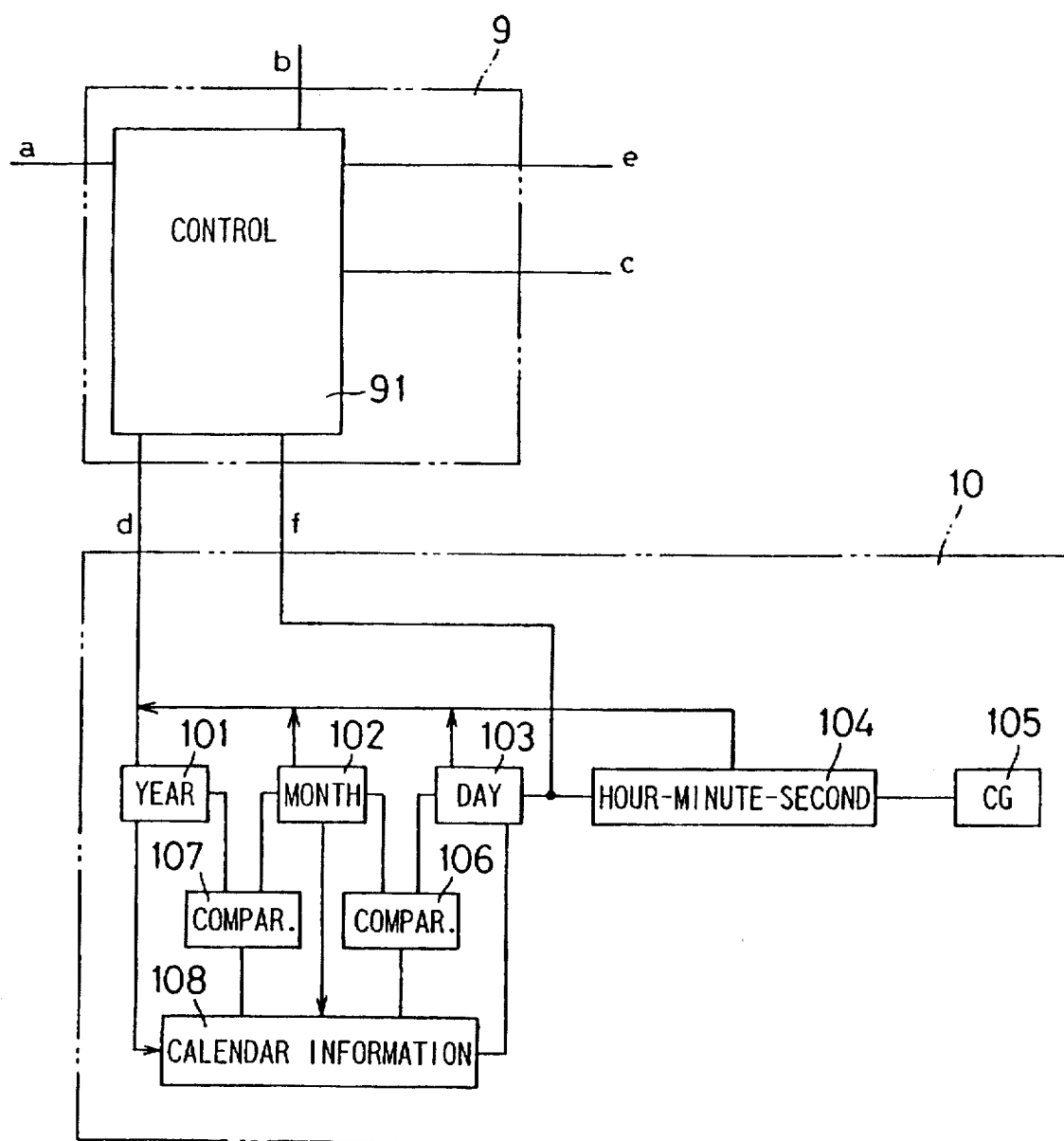
FIG. 4 is a detailed block diagram showing a central control and an RTC.

FIG. 4 is a detailed block diagram of the central control 9 and the RTC 10. The RTC 10 includes calendar information 108, a year counter 101 which counts years, a month counter 102 which counts months, a day counter 103 which counts days, an hour-minute-second counter 104 which includes an hour counter, a minute counter, and a second counter, a clock generator (hereinafter referred to as CG) 105 which calculates time, and comparative circuits 106 and 107 which compare these counters and the calendar information 108.

The CG 105 for time calculation generates a pulse signal per second and transmits the signal to the hour-minute-second counter 104. On receiving the signal, the second counter of the hour-minute-second counter 104 is incremented by one. When the second counter reaches "60", the minute counter is incremented by one. In the same manner, when the minute counter reaches "60", the hour counter is incremented by one. When counting 24 hours, the hour-minute-second counter 104 transmits a signal to the day counter 103 which is then incremented by one. At the same time, the signal is transmitted to the control 9 via a date change control line "f".

Every time the day counter 103 is incremented, the comparison circuit 106 compares the contents of the day counter 103 with the contents of the calendar information 108, and judges whether the current value is the end of a month. When the end of a month has passed, a signal is transmitted from the comparison circuit 106 to the month counter 102, thereby incrementing the contents of the month counter 102 by one. Every time the month counter 102 is incremented, the comparison circuit 107 compares the contents of the month counter 102 with the contents of the calendar information 108 and judges whether the current value exceeds "12".

When the current value exceeds "12", a signal is transmitted from the comparison circuit 107 to the year counter 101, thereby incrementing the contents of the year counter 101 by one. When these changes in the year, month, and day are also stored in the calendar information 108. The contents of the year counter 101, the month counter 102, the day counter 103, and the hour-minute-second counter 104 are transmitted to a control 91 via the control line "d".

The schedule input screen will be explained as follows with reference to FIG. 5 which shows an example of the display screen of the liquid crystal display 2-1. The schedule input screen is mainly composed of process selection sections 13 to 16, a schedule contents input/output section 17, and a function selection section 18.

In the case of forming schedule data, schedule data are hand-written-inputted to the schedule contents input/output section 17 through the pressing of the transparent tablet 2-2. The schedule contents input/output section 17 is displayed on the liquid crystal display 2-1 via the transparent tablet 2-2. The central control 9 recognizes characters and inputs the date, time, and schedule contents.

The inputted schedule contents are then stored in the RAM 12-2 by selecting the resister button 15 on the liquid crystal display 2-1 through the pressing of the transparent tablet 2-2. The schedule data to be registered include the date, time, and schedule contents as required items. When registered in the RAM 12-2, the schedule data are sorted by date and stored in the memory.

When the cancel button 16 on the schedule input screen is selected, the contents which are currently being inputted are abandoned. When the month bottom 13 is selected, the month display screen appears. When the day button 14 is pressed, the day schedule display screen appears as shown in FIG. 6.

The schedule display of the invention will be explained with reference to the display screen example on the input/output portion 2 shown in FIG. 6 and the construction and operation of the central control 9 shown in the flowcharts of FIGS. 7–9.

Figure 6:
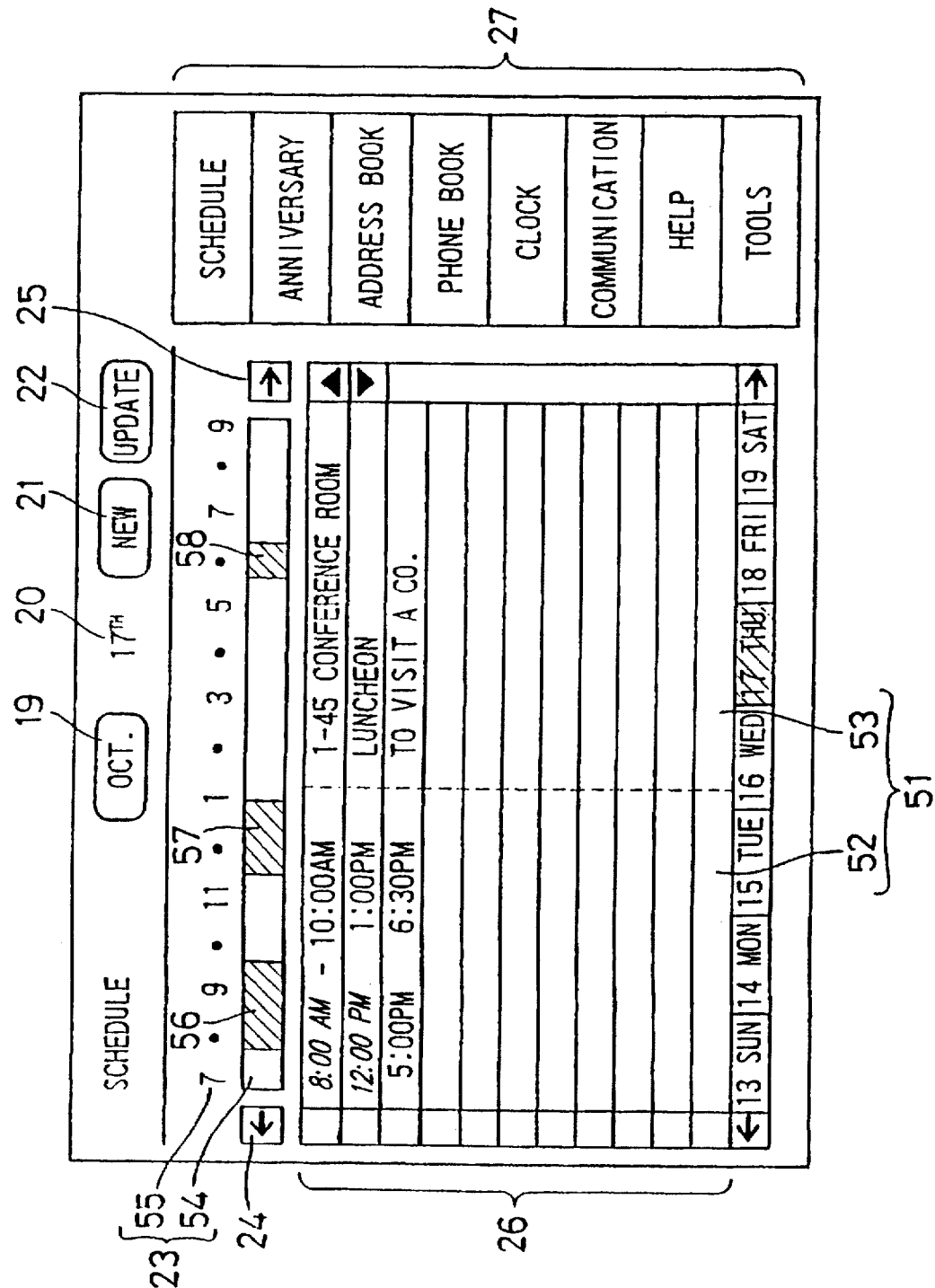
FIG. 6 is a view showing another example of display schedule input screen.
Figure 7:
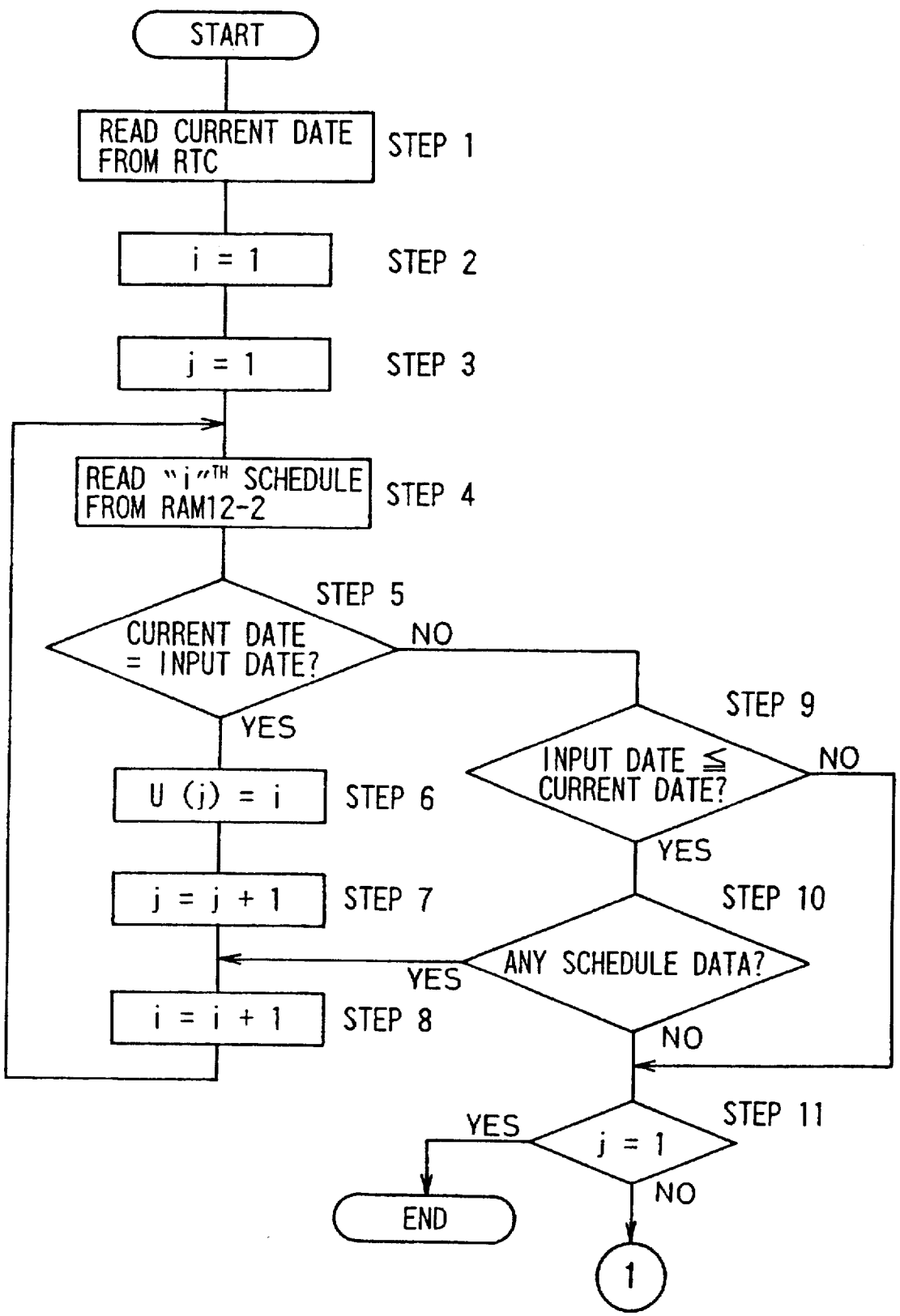
FIG. 7 is a flowchart in relation to a schedule retrieving process.

In FIG. 6, the characters including letters of schedule contents 26 are displayed in three colors which indicate morning, afternoon, and evening, respectively, from top to bottom. On a bar graph 23, each time period is shown in the color which corresponds to the time period.

In a table 51 shown in FIG. 6, each starting time on the starting time display area 52 is displayed in association with the corresponding schedule content on a schedule contents display area 53.

In the display screen shown in FIG. 6, a bar graph display 23 is formed above the table 51. The bar graph display 23 consists of a bar graph display area 54 which extends in the horizontal direction slenderly, and a time display area 55 which is slenderly placed along the bar graph display area 54. In the time display area 55, the numeric characters 7, 9, 11, 1, 3, 5, 7, and 9 which indicates hours within a period of 7:00 a.m. to 9:00 p.m. are displayed at regular intervals. The symbols "·", between these numeric characters represent 8, 10, 12, 2, 4, 6, and 8, respectively. The end time of each schedule content is also inputted and shown together with the starting time in the starting time display area 52. The starting times and end times of the schedule contents are also shown in the bar graph display 23 as schedule time periods 56, 57, and 58. In the table 51 and the bar graph display 23, each schedule content is displayed in the color corresponding to the predetermined time period to which the starting time of the schedule content belongs.

Figure 5:
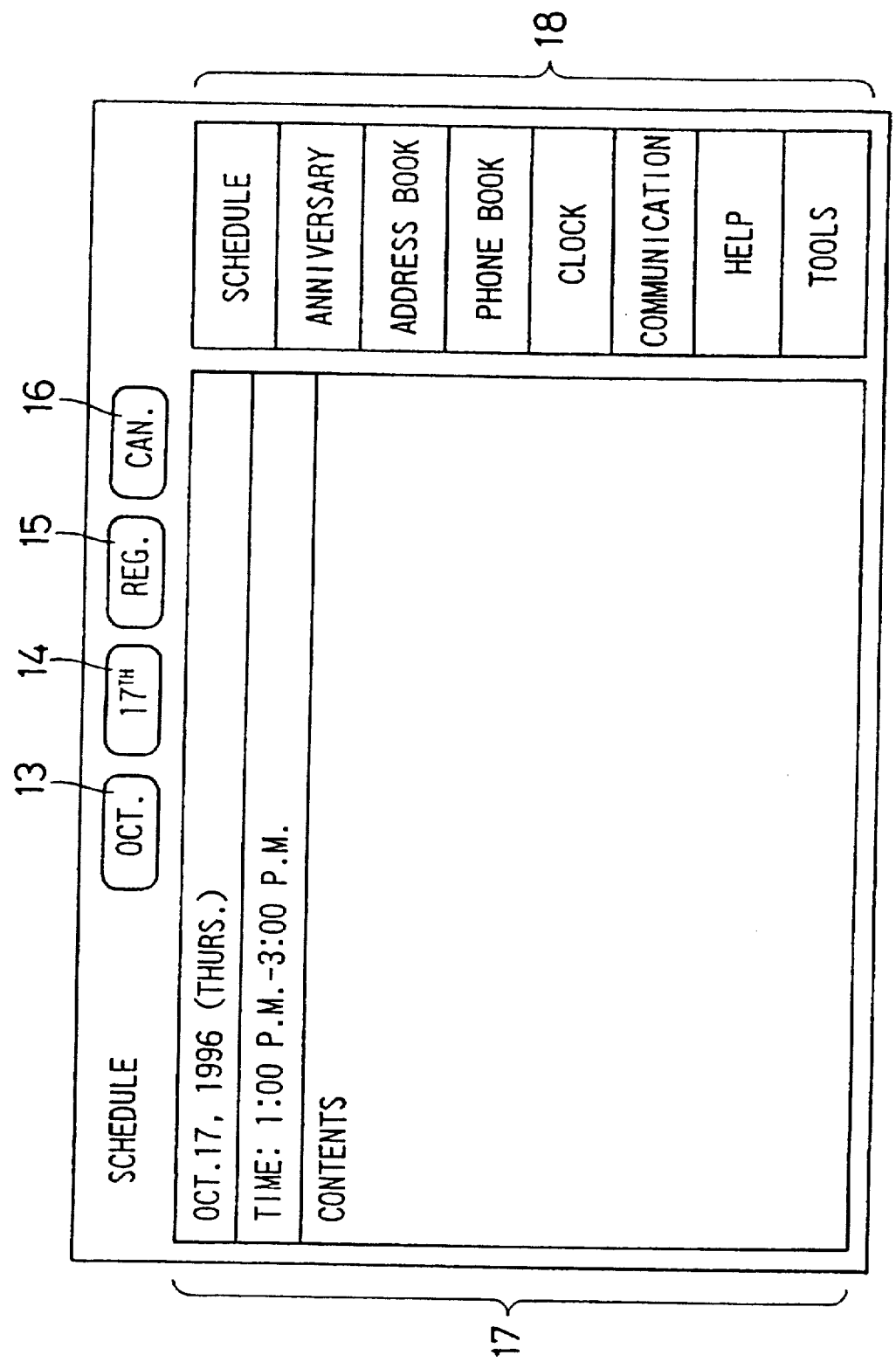
FIG. 5 is a view showing an example of schedule input screen.

Similar to the display screen example shown in FIG. 5, the schedule input screen shown in FIG. 6 is basically composed of process selection sections 19 to 22, the schedule contents input/output section 26, and a function selection section 27. The time in the bar graph 23 moves in accordance with the selection of cursors 24 and 25.

In other words, the bar graph display area 54 and the time display area 55 move to the right and left to display schedules in other time.

The schedule retrieving process will be explained hereinafter with reference to the flowchart of FIG. 7.

At step 1, the current date is read from the RTC 10. At steps 2 and 3, the counter "i" which indicates a schedule and the counter "j" which indicates an array U for temporarily storing the schedule are initialized. At step 4, the date of the "i" th schedule is read from the RAM 12-2. At step 5, the date is compared with the current date which has been read from the RTC 10. At step 6, when the date is equal to the current date, in other words when there is data to be displayed, the counter value is stored in the array U for a temporary storage. At step 7, the counter "j" is incremented by one. When the comparison which has done at step 5 indicates that the input date and the current data are not equal, these dates are compared with each other at step 9. When the schedule which is being currently read comes after the current date, the reading of the subsequent schedule data is meaningless, so that the process proceeds to step 11. On the other hand, when the comparison of the current date and the input date indicates that the schedule which is being currently read comes before the current date and the schedule data still exists, the counter "i" is incremented at step 8 to continue the retrieval of the schedule data. At step 11, the presence or absence of the temporary stored data, that is, data to be displayed is checked and when there is not any, the display is terminated.

The displaying process of a schedule will be explained as follows with reference to the flowcharts of FIGS. 8 and 9.

At step 12, the counter "p" for displaying schedules is initialized. At step 13, the date of the schedule data is read from the RAM 12-2. At step 14, the color information for display is set to a variable of color through time comparison. In order to simplify the process, the time is divided into morning, afternoon, and evening.

When a certain time of a day is referred to as T, the morning hours, afternoon hours, and evening hours are defined as 12:00 a.m.$\leq$T<10:00 a.m., 10:00 a.m.$\leq$T<5:00 p.m., and 5:00 p.m.$\leq$T<12:00 a.m.(the next day), respectively. At step 18, a bar graph is displayed. At step 19, the contents information is displayed. At step 21, the counter "p" is incremented. At step 22, it is checked whether or not the entire array which has been temporarily stored has been displayed, and when the display has not been finished, it is continued. A series of processes for the schedule display can be carried out in this manner.

The process of changing colors will be explained as follows with reference to the display screen examples shown in FIGS. 10 to 12.

Figure 10:
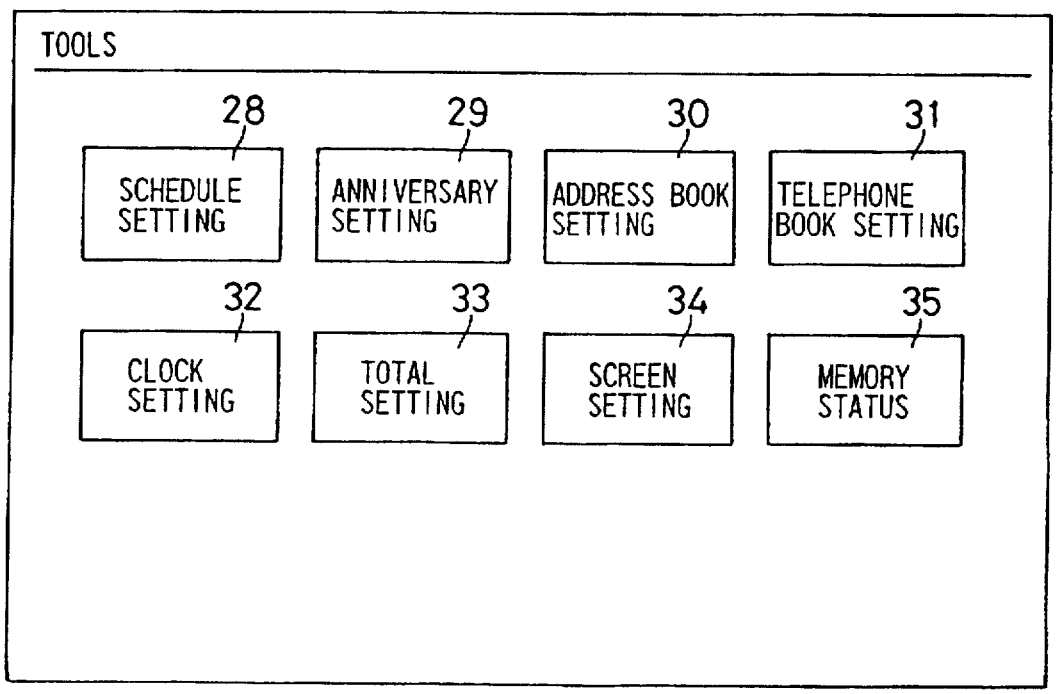
FIG. 10 is a view showing an example of display screen.
Figure 11:
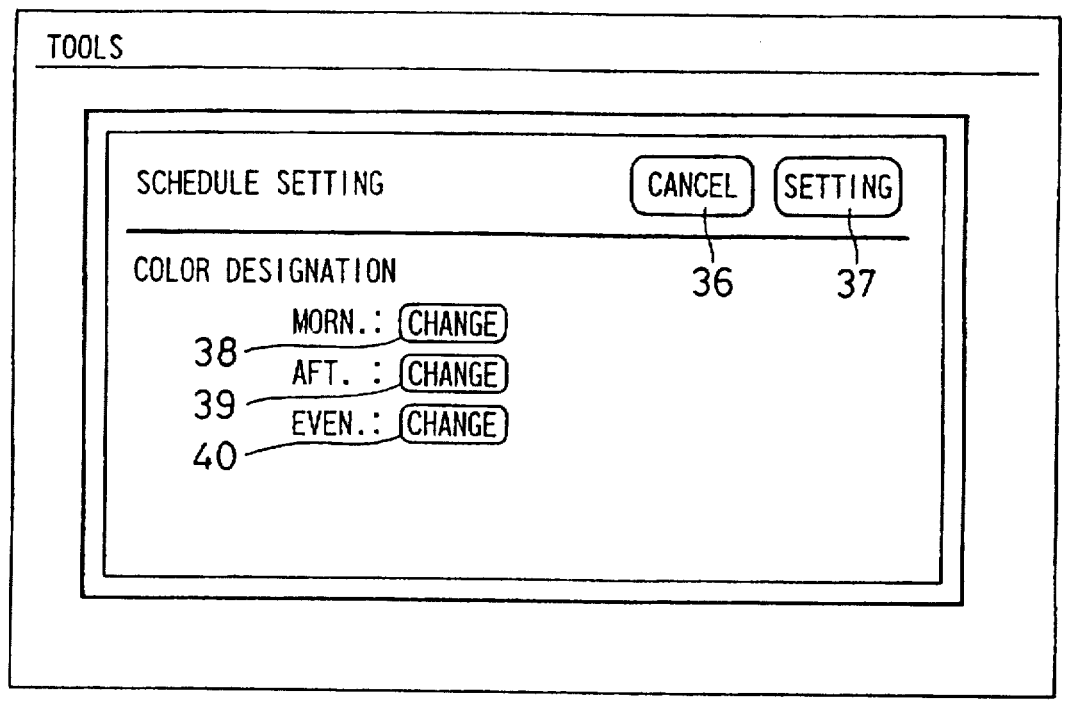
FIG. 11 is a view showing an example of display screen for color setting.

When the button of TOOLS is selected from a process selection section 18 which is on the display screen example of FIG. 5, the screen shown in FIG. 10 appears. The screen of FIG. 10 includes schedule setting 28, anniversary setting 29, address book setting 30, telephone book setting 31, clock setting 32, total setting 33, screen setting 34, and memory status 35. By selecting the schedule setting 28 shown in FIG. 10, the screen shown in FIG. 11 appears. The colors for the morning, afternoon, and evening are changed by selecting a morning color change button 38, an afternoon color change button 39, and a evening color change button 40, respectively. The color change is executed by pressing a setting button 37, and the process is canceled by pressing a cancel button 36.

Figure 12:
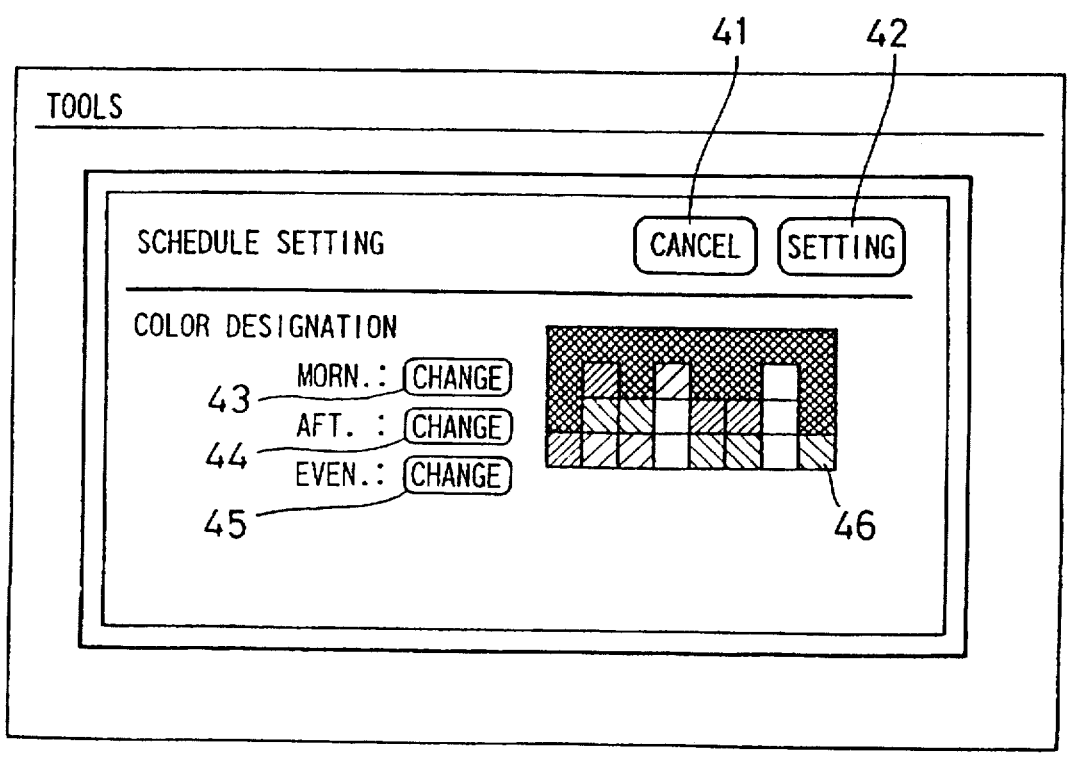
FIG. 12 is a view showing another example of display screen for color setting.

When changing the colors, the pallet shown in the display screen example of FIG. 12 is displayed to select desired colors. In steps 15 to 17 of FIG. 8, colors are changed by changing the color value to be substituted in the variable of color by operating the morning color change button 38, the afternoon color change button 39, the evening color change button 40, and a color designation button 46 and by setting the color with a setting button 42. When the cancel button 41 is pressed, another operation process is started without setting the selected colors.

Another color changing process will be described hereinafter based on the display screen shown in FIG. 13 and the storage example of a color information storage 123 shown in FIG. 14.

Figures 13, 14:
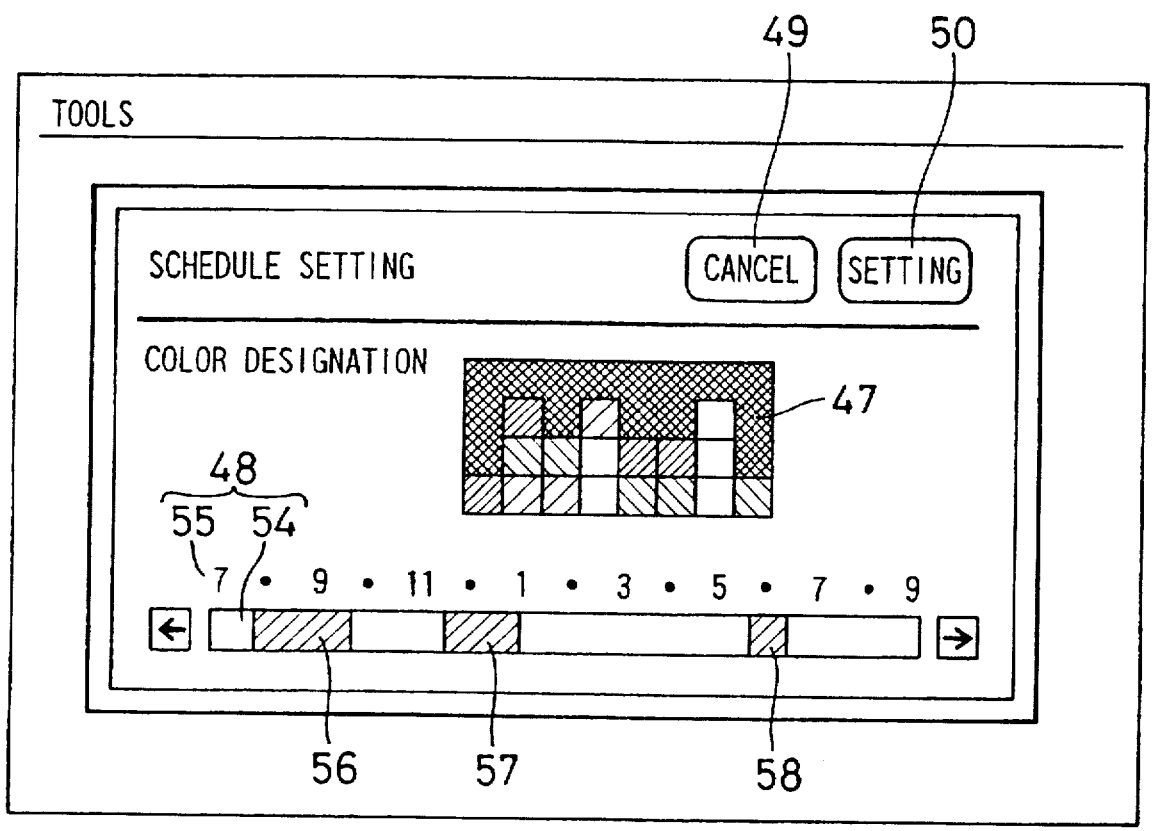
FIG. 13 is a view showing still another example of display screen for color setting.
FIG. 14 is a view showing an example of storing color information in a color information storage.

In the screen shown in FIG. 13, the starting time and the end time are set through a time axis 48 and the color for the time period is set through a color designation 47. The color information thus inputted is stored to an array D in the RAM 12-3 as color information for every 15 minutes. When displayed, the starting time is divided into hours and minutes and the starting time is divided into 15-minute units, so that the color information can be read from the array D in the RAM 12-3 shown in FIG. 14 by adding an integer which is obtained by multiplying the hours by 4 and an integer obtained by dividing minutes by 15. The color information is set to the graph and the variable of color of the content display. In the same manner as the screen shown in FIG. 12, colors can be changed by pressing a setting button 50 and the process can be canceled by pressing a cancel button 49 shown in FIG. 13.

Table 1 below shows the relationship between the time periods and the color information in each embodiment of the invention.

TABLE 1

| Color information | Time periods | First embodiment | Second embodiment | Third embodiment |
|---|---|---|---|---|
| color information 1 | today's 0:00 a.m. ≦ T < 0:15 a.m. | green | green | red |
| color information 2 | today's 0:15 a.m. ≦ T < 0:30 a.m. | | | |
| color information 3 | today's 0:45 a.m. ≦ T < 1:00 a.m. | | | |
| color information 4 | today's 1:00 a.m. ≦ T < 1:15 a.m. | | | |
| ... | | | | |
| color information 41 | today's 9:15 a.m. ≦ T < 9:30 a.m. | | | |
| color information 42 | today's 9:30 a.m. ≦ T < 9:45 a.m. | | | yellow |
| color information 43 | today's 9:45 a.m. ≦ T < 10:00 a.m. | | | |
| color information 44 | today's 10:00 a.m. ≦ T < 10:15 a.m. | yellow | | |
| ... | | | | |
| color information 52 | today's 12:45 a.m. ≦ T < 1:00 p.m. | | | |
| color information 53 | today's 1:00 p.m. ≦ T < 1:15 p.m. | | orange | blue |
| ... | | | | |
| color information 60 | today's 2:45 p.m. ≦ T < 3:00 p.m. | | | |
| color information 61 | today's 3:00 p.m. ≦ T < 3:15 p.m. | | | |
| ... | | | | |
| color information 66 | today's 4:15 p.m. ≦ T < 4:30 p.m. | | | |
| color information 67 | today's 4:30 p.m. ≦ T < 4:45 p.m. | | | black |
| color information 68 | today's 4:45 p.m. ≦ T < 5:00 p.m. | | | |
| color information 69 | today's 5:00 p.m. ≦ T < 5:15 p.m. | blue | | |
| ... | | | | |
| color information 72 | today's 5:45 p.m. ≦ T < 6:00 p.m. | | | |
| color information 73 | today's 6:00 p.m. ≦ T < 6:15 p.m. | | | |
| ... | | | | |
| color information 76 | today's 6:45 p.m. ≦ T < 7:00 p.m. | | | |
| color information 77 | today's 7:00 p.m. ≦ T < 7:15 p.m. | | blue | |
| ... | | | | |
| color information 95 | today's 11:30 p.m. ≦ T < 11:15 p.m. | | | |
| color information 96 | today's 11:45 p.m. ≦ T < next day's 0:00 a.m. | | | |

Figure 8:
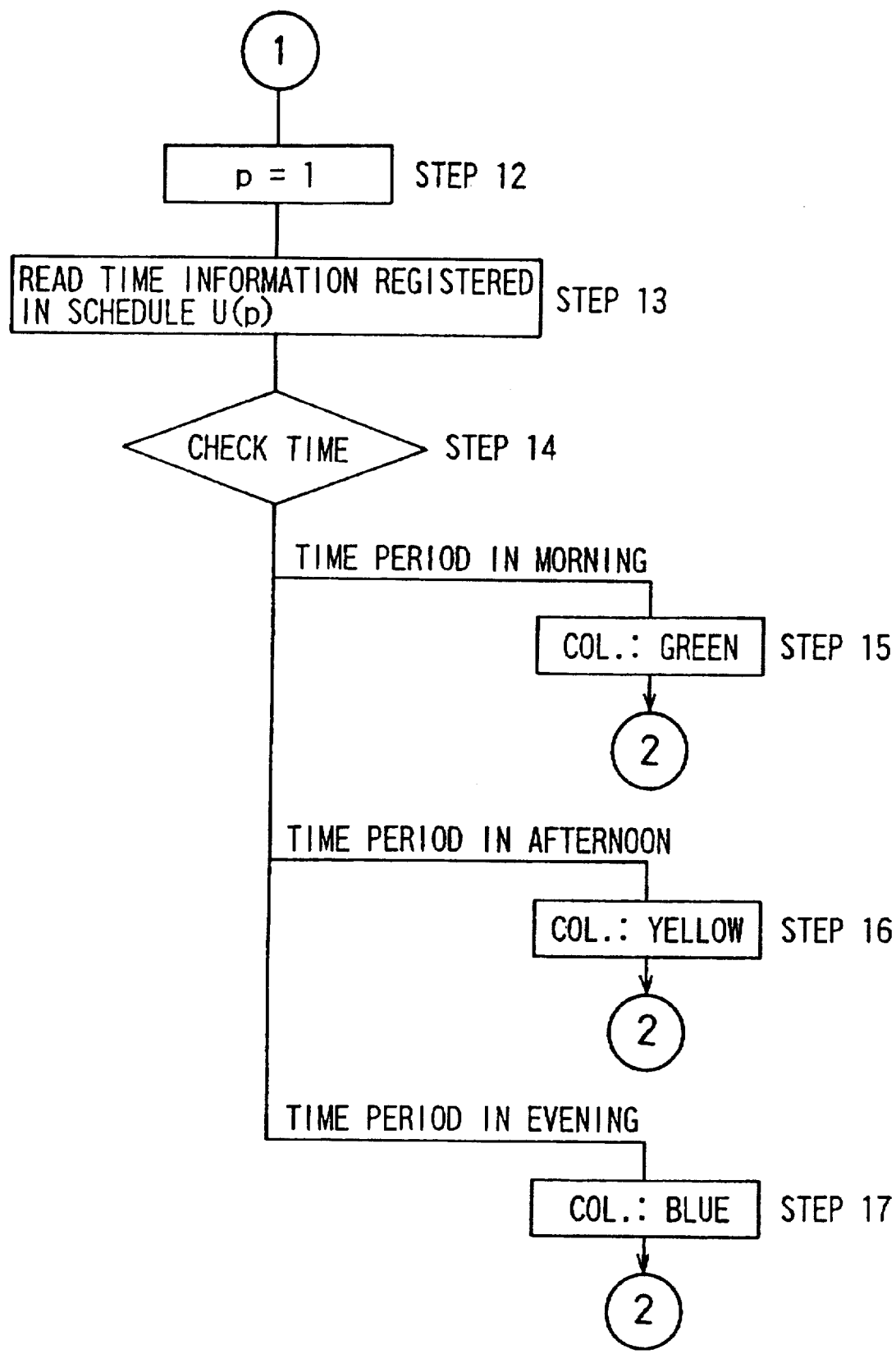
FIG. 8 is a flowchart in relation to a schedule displaying process.
Figure 9:
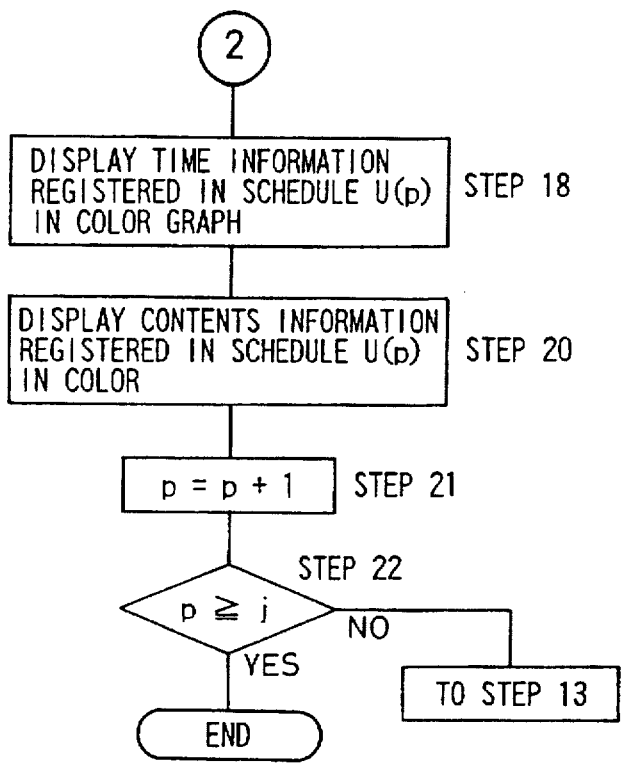
FIG. 9 is a flowchart in relation to the schedule displaying process.

In a first embodiment, one day is divided into three time periods as shown in FIGS. 8 and 9. The first time period is today's 12:00 a.m.≦T<10:00 a.m. which is made to correspond to green. The second time period is 10:00 a.m.≦T<5:00 p.m. which is made to correspond to yellow. The third time period is 5:00 p.m.≦T<next day's 12:00 a.m. which is made to correspond to blue. In the embodiments, one day is divided into 15-minute units which is the predetermined time units, which means that one day is divided into 96 time units (=24×60/15). For each time unit, color information 1 to color information 96 are set to the array D of the memory. The colors for several time periods can be set by selecting one color from among several colors which are displayed in the color designation section 47. In the first embodiment, the first to third time periods correspond to green, yellow, and blue, respectively. In a second embodiment, the first to third time periods correspond to green, orange, and blue, respectively. In a third embodiment, there are four time periods and the first to fourth time periods correspond to red, yellow, blue, and black, respectively. Each of the time periods can be set every 15 minute unit. For example, in the third embodiment, the color information 1 to color information 41 which belong to the first time period is set to red; the color information 42 and color information 52 which belong to the second time period is set to yellow; the color information 53 to color information 66 which belong to the third time periods is set to blue; and the color information 67 to color information 96 which belong to the fourth time period is set to black.

In the third embodiment shown in Table 1, the first time period is today's 12:00 a.m.≦T<9:30 a.m., the second time period is 9:30 a.m.≦T<1:00 p.m., the third time period is 1:00 p.m.≦T<4:30 p.m., and the fourth time period is 4:30 p.m.≦T<next day's 12:00 a.m.

Figure 15:
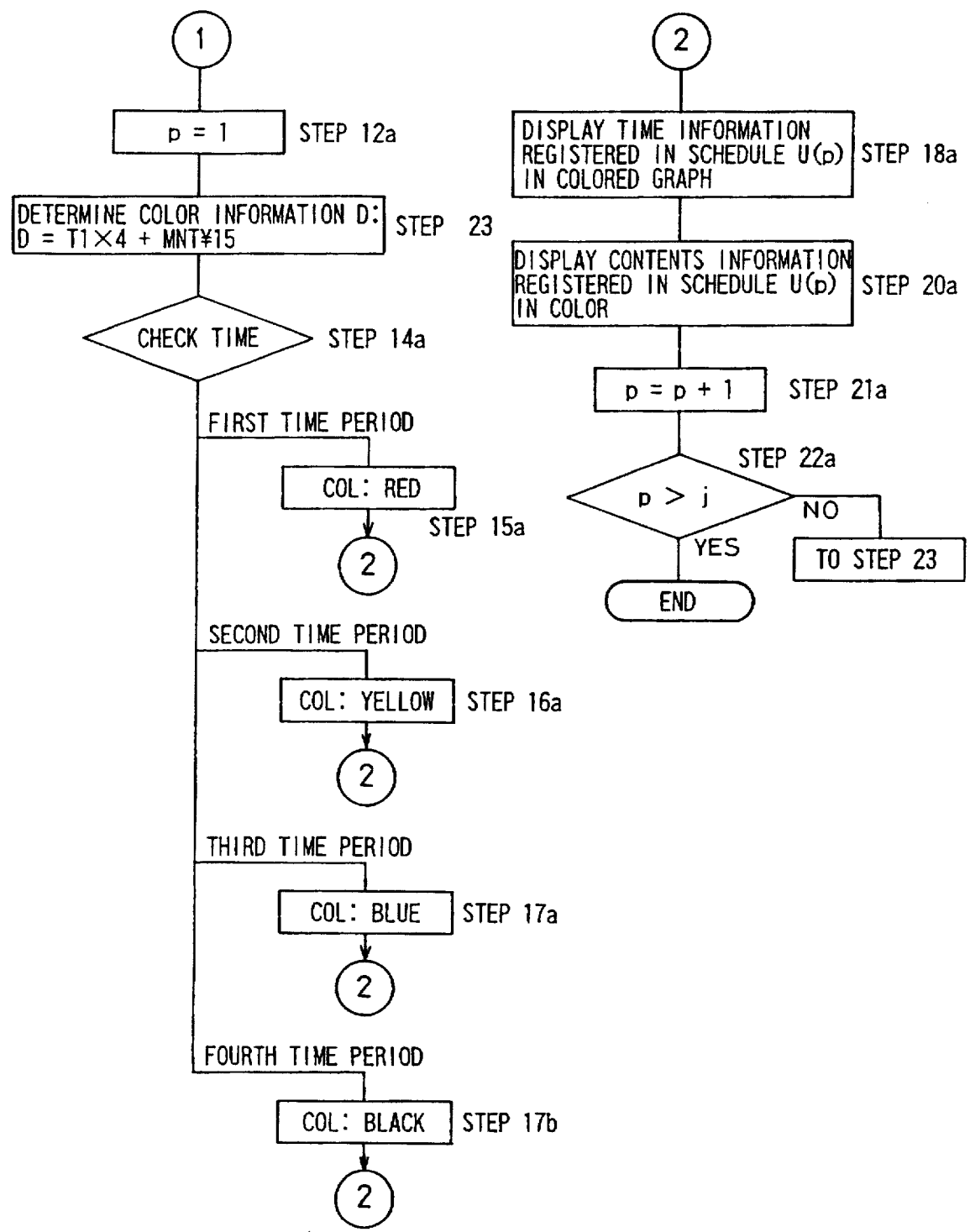
FIG. 15 is a flowchart for depicting the operation of a central control 9 to achieve a third embodiment of Table 1.

FIG. 15 is a flowchart which depicts the operation of the central control 9 to achieve the third embodiment shown in Table 1. This flowchart resembles the flowcharts shown in FIGS. 8 and 9 and the corresponding steps are referred to by appending subscript "a" or "b" to the same numeric characters. The feature of this embodiment is that a color information D is determined at step 23 shown in FIG. 15 to select one of the color information 1 to color information 96 which corresponds to the starting time of a schedule content.

$$D = T1 \times 4 + MNT¥15 \tag{1}$$

In the above equation (1), T1 represents hours which are expressed in a 24-hour system, MNT represents minutes within one hour, and MNT¥15 represents the integer part of the quotient E which is obtained by dividing minutes by 15 as follows.

$$E = MNT/15 \tag{2}$$

For example, E is 59/15=3.93 at 16:59 in the 24-hour system or at 4:59 p.m. Consequently, MNT¥15 is 3, and D is 16×4+3=67. Therefore, black which corresponds to the color information 67 is selected at step 17b for the starting time 4:59 p.m. The other operations are carried out in the same manner as in the foregoing embodiments.

The invention may be embodied in other specific forms without departing from the sprit or essential characteristics thereof. The present embodiments are therefore to be considered in all respects as illustrative and not restrictive, the scope of the invention being indicated by the appended claims rather than by the foregoing description and all changes which come within the meaning and the range of equivalency of the claims are therefore intended to be embraced therein.

What is claimed is:

1. An information processing apparatus comprising:
   an input device operable to receive schedule data including a date, a starting time in the date, and a schedule content which is to be started at the starting time;
   a memory electronically coupled to the input and storing the schedule data, wherein the memory also stores color data correlated to time periods of a day;
   a display electronically coupled to the memory and visually presenting the schedule data; and
   a display controller electronically coupled to the display, detecting the time period of the day in which the start time occurs, and generating control signals for the display to present the schedule data in a color corresponding to the color data for the time period which includes the start time.

2. A data processing apparatus comprising:
   an input device operable to receive schedule data including a date, a starting time in the date, and a schedule content which is to be started at the starting time;
   a memory electronically coupled to the input and storing the schedule data;
   a display electronically coupled to the memory and visually presenting the schedule data; and
   a display controller electronically coupled to the display and generating control signals for the display to present the schedule data in a color varied according to a starting time of the schedule data
   a color memory for storing colors, dividing one day into a plurality of time periods, assigning different colors to the plurality of time periods, and storing the different colors in association with the corresponding time periods, wherein
   the display controller detects a time period to which the starting time of the schedule data belongs and controls the display to display the schedule data in a color assigned to the detected time period of the colors stored in the color memory.

3. The information processing apparatus of claim 2, comprising setting means for variably setting time periods and colors stored in the color storing means.

4. The information processing apparatus of claim 3, wherein the setting means divides one day into predetermined time units and the time periods are determined by grouping the time units.

5. The information processing apparatus of claim 1, wherein
   the display presents a starting time display area showing a plurality of starting times and a schedule content display area showing a plurality of schedule contents in a table to individually correspond to each other,
   a color memory having data correlating a color to each of a plurality of time periods in a day, and
   the display controller detects the time period in which occurs the starting time, and causes the display to show the starting times shown in the starting time display area and the schedule contents shown in the schedule content display area in colors corresponding to time periods that includes the starting times.

6. The information processing apparatus of claim 1, wherein the display comprises:
   a bar graph display area extending in a horizontal or vertical direction, and
   a time display area arranged along the bar graph display area, in which numeric characters representing times of at least part of the day are displayed at regular intervals;
   end times of schedule contents are also inputted by the input; and
   the display controller shows a schedule time period of the schedule data which extends from the starting time to the end time as a bar graph in the bar graph display area in a color corresponding to the starting time.

7. A method for presenting a schedule shown on a display of an information processing apparatus comprising the following steps:
   a. input into the information processing apparatus schedule data including an event date, an event starting time in the event date, and an event identifier;
   b. divide a day into a plurality of time periods and assign a color to each time period;
   c. store in the information processing apparatus the schedule data, and the color assigned to each time period of the day;
   d. detect the time period that includes each event starting time and correlate the event starting time to the color assigned to the detected time period;
   e. display on a display of the information processing apparatus the schedule data; and
   f. control the display to display the schedule data in the color correlated to the event starting time.

8. A method for presenting a schedule on a display of an information processing apparatus comprising the following steps:
   a. input into the information processing apparatus schedule data including an event date, an event starting time in the event date, and an event identifier;
   b. store in the information processing apparatus the schedule data;
   c. present on a display at least a portion of the schedule data;
   d. divide the event day into a plurality of time periods and assign a different color to each of the plurality of time periods;
   e. storing the assigned colors in association with the corresponding time periods, and
   f. detect when a time period includes an event starting time and controls the display to present the event identifier in the color assigned to the detected time period.

* * * * *